No. 664,038. Patented Dec. 18, 1900.
A. DE DION & G. BOUTON.
FRICTION CLUTCH.
(Application filed Aug. 14, 1900.)
(No Model.) 2 Sheets—Sheet 2.

Witnesses:
N. Lee Helms.
C. D. Kasler.

Inventors
Albert DeDion
Georges Bouton
By James L. Norris.
Atty.

UNITED STATES PATENT OFFICE.

ALBERT DE DION AND GEORGES BOUTON, OF PUTEAUX, FRANCE.

FRICTION-CLUTCH.

SPECIFICATION forming part of Letters Patent No. 664,038, dated December 18, 1900.

Application filed August 14, 1900. Serial No. 26,898. (No model.)

*To all whom it may concern:*

Be it known that we, ALBERT DE DION and GEORGES BOUTON, engineers, citizens of the French Republic, residing at Puteaux, Seine, France, (our post-office address being 24 Quai National, Puteaux,) have invented certain new and useful Improvements in Friction-Clutches, of which the following is a specification.

This invention relates to certain new and useful improvements in clutches of the class described in our previous Letters Patent No. 645,312, dated March 13, 1900, in which segments fixed on the driving-shaft are caused to rub against the inner surface of sleeves rotating freely on the said shaft; and it consists in novel combination and arrangements of parts hereinafter more specifically described for recovering the wear produced by the friction between these surfaces.

Figure 1:
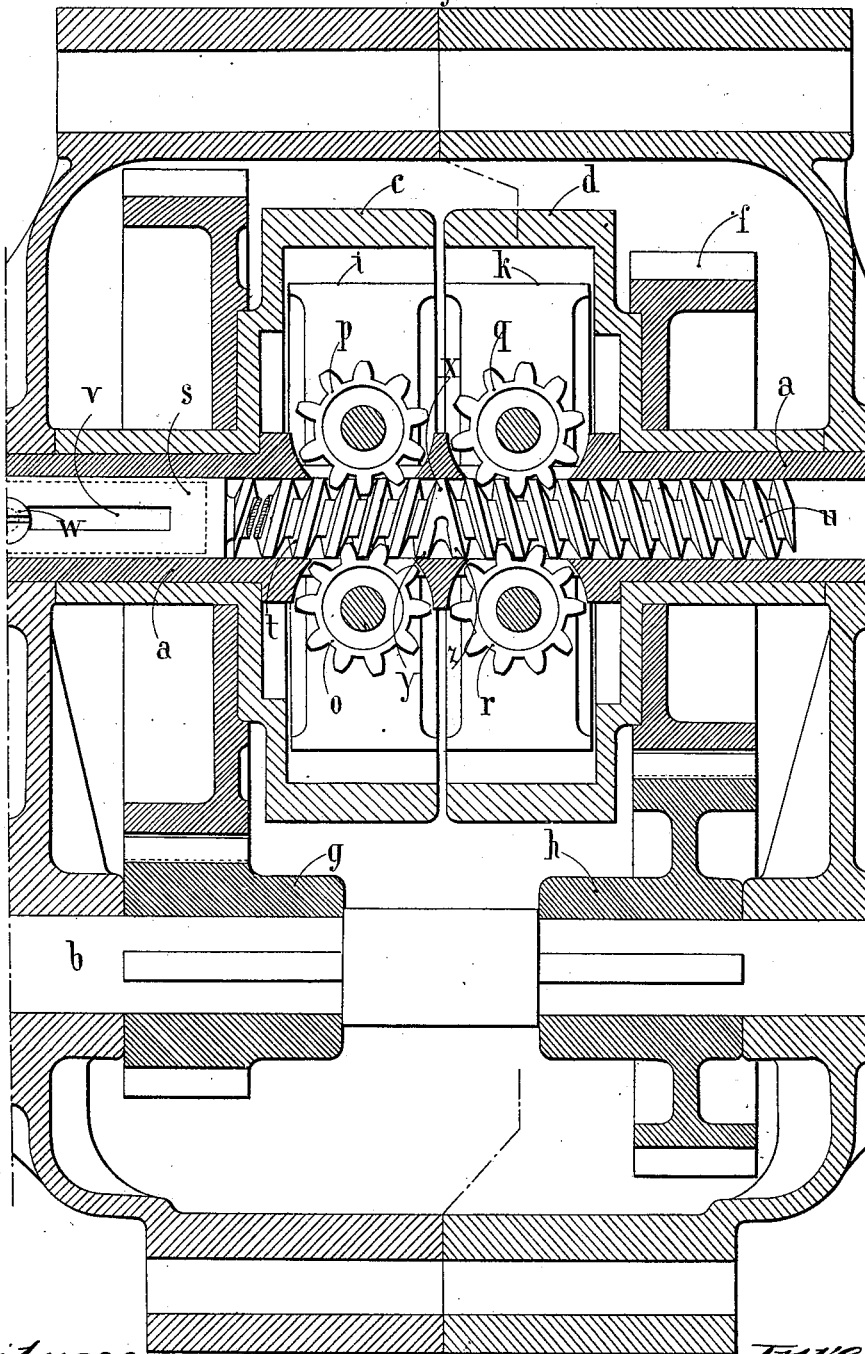
Figure 2:
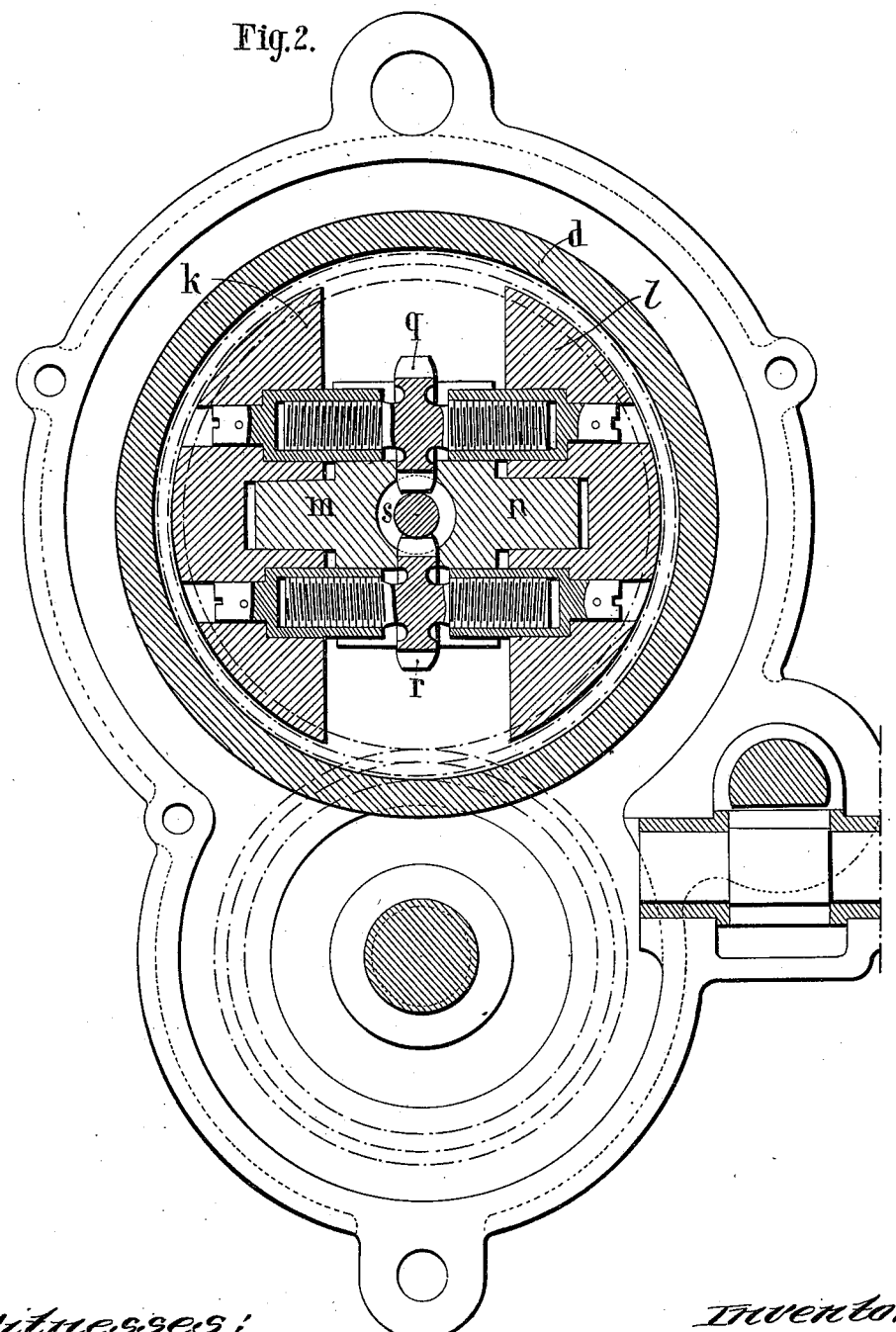

In the annexed drawings, Figure 1 is a vertical section through the axis of the mechanism. Fig. 2 is a transverse section of the same.

The transmission-shaft $a$, to which the movement of the driving-shaft $b$ is to be transmitted, is hollow, and on this shaft revolve freely two sleeves $c$ $d$, on which are fixed, respectively, the toothed wheels $e f$, gearing, respectively, with the pinions $g$ and $h$, keyed on the driving-shaft $b$. These sleeves $c$ $d$ may be caused to rotate conjointly with the shaft $a$ by means of the arrangement of a pair of segments $i$ (only one shown, Fig. 1) and the segments $k$ $l$, Fig. 2, which slide on shoulders $m$ $n$, provided on the middle part of the hollow transmission-shaft $a$. The separating movement of the said segments $i$ or $k$ and $l$ is effected by turning on opposite directions to each other the pinions $o$ and $p$ or $q$ and $r$, the axles of which are screw-threaded in opposite directions and engage in corresponding screw-threaded parts of the segments. As described in our previous patent, No. 645,312, the rotation of these pinions was produced by means of a cylindrical rod provided with a double row of teeth, forming a double rack, sliding in the hollow shaft and gearing with the said pinions. According to the present invention the double rack is replaced by a cylindrical rod $s$, having two screw-threads $t u$ arranged in opposite directions of each other, the shape or transverse section of these threads being the same as the teeth of a rack gearing with the pinions $o p q r$. The cylindrical rod $s$ is provided with two diametrically opposite grooves $v$, in which engage screws $w$, the purpose of which is to prevent any angular displacement of the double-screwed rod $s$ and to permit of a longitudinal sliding only. The function of the said rod $s$ is therefore the same as that of a rack, but with considerable advantages with regard to the frequent regulating or wear-recovering operations required by the rapid wear of the rubbing-surfaces of the segments and the sleeves. In order to recover this wear—say to approach the segments near the sleeves—it is necessary to rotate the pinions $o p q r$ in suitable direction. With the double rack as hitherto constructed this regulating operation could only be effected by taking out the rack, and therefore disconnecting some parts of the mechanism. A very great difficulty by effecting this operation results from this requirement that all the pinions need to be turned with the same angular quantity in order to prevent any shrinking and bad position of the segments on their slides. The new rack having the form of a double screw avoids all these inconveniences and considerably simplifies the regulating operation, which will only require to release the screws $w$, engaging the grooves $v$, and then to turn the rod $s$ in a suitable direction. It will be easily understood that this rotary movement is communicated to the pinions and to their screw-threaded axles, which cause the segments to be drawn from the sleeves. It will be evident that the amount of the rotation of the rod $s$ must be exactly half a revolution or a multiple of half a revolution, so that the points $y$ $z$ and the junction-point $x$ of the threads $t$ and $u$ will be always placed in the plane of the pinions $o$ $r$ and $p$ $q$, respectively, as shown in Fig. 1, in order to permit of longitudinal displacement of the rod $s$.

By means of the above-described arrangement the regulating or wear-recovering operations, which are the main object of the present invention, will be effected without disconnecting any parts of the mechanism or removing the clutch itself from the car or from the machine to which it belongs.

Having now particularly described and ascertained the nature of the said invention and the manner in which the same may be performed, we declare that what we claim is—

The combination with a hollow shaft, sleeves suitably connected thereon, pinions fast on said sleeves and operated by a drive-shaft, segments suitably arranged in said sleeves and two pairs of vertically-alining pinions for operating said segments, of a longitudinally-moving rod having a pair of diametrically opposite grooves and further provided with two series of screw-threads for operating the two pair of alining pinions in opposite directions imparting movement thereby to said segments, and screws engaging in said grooves to prevent the angular displacement of said rod, substantially as herein shown and described.

In testimony whereof we have hereunto set our hands in presence of two subscribing witnesses.

ALBERT DE DION.
GEORGES BOUTON.

Witnesses:
EDWARD P. MACLEAN,
EMILE KLOTE.